United States Patent [19]
Sato et al.

[11] Patent Number: 5,251,049
[45] Date of Patent: Oct. 5, 1993

[54] REFLECTION TYPE ACTIVE MATRIX LIQUID CRYSTAL APPARATUS

[75] Inventors: Masuji Sato; Akira Tanaka; Noboru Wakatsuki, all of Kawasaki, Japan

[73] Assignee: Fujitsu Limited, Kawasaki, Japan

[21] Appl. No.: 717,066

[22] Filed: Jun. 18, 1991

[30] Foreign Application Priority Data

Jun. 22, 1990 [JP] Japan .................. 2-162955

[51] Int. Cl.$^5$ .................. G02F 1/133; G02F 1/137
[52] U.S. Cl. .................. 359/40; 359/59; 359/63; 359/74; 359/87; 359/93; 359/67
[58] Field of Search .................. 359/54, 55, 57, 59, 359/67, 70, 93, 40, 41; 340/784; 353/31, 33, 34, 122; 358/61

[56] References Cited

U.S. PATENT DOCUMENTS

| | | | |
|---|---|---|---|
| 3,785,721 | 1/1974 | Harsch | 359/93 |
| 4,127,322 | 11/1978 | Jacobson et al. | 359/72 |
| 4,239,346 | 12/1980 | Lloyd | 359/59 |
| 4,393,380 | 7/1983 | Hosokawa et al. | 359/59 |
| 4,566,758 | 1/1986 | Bos | 359/93 |
| 4,648,691 | 3/1987 | Oguchi et al. | 359/59 |
| 4,759,610 | 7/1988 | Yanagisawa | 359/59 |
| 4,786,147 | 11/1988 | Clerc et al. | 359/93 |
| 4,995,702 | 2/1991 | Aruga | 359/93 |
| 4,999,619 | 3/1991 | Te Velde | 359/54 |
| 5,056,895 | 10/1991 | Kahn | 359/74 |

FOREIGN PATENT DOCUMENTS

0271344 6/1988 European Pat. Off. .

OTHER PUBLICATIONS

Grinberg et al., "Liquid Crystal Light Valve for Coherent Optical Data Processing", Conference: Applications of Holography and Optical Data Processing—Aug., 1976, pp. 479-496.

Tsuda et al.—"Reflective Type LC Panel for High Definition LC Projection TV", 1989 Autumn National Convention Record—Sep. 1989—pp. 5-31.

*Primary Examiner*—John S. Heyman
*Assistant Examiner*—Tai V. Duong
*Attorney, Agent, or Firm*—Staas & Halsey

[57] ABSTRACT

A reflection type liquid crystal apparatus comprising a liquid crystal panel (26) composed of a pair of first and second opposed plates (30, 32) for accommodating a liquid crystal (34) therebetween. A reflecting layer (28) is provided in the inner surface of the second plate, and the first plate is transparent. A common electrode (36) is provided in the first plate, and picture electrodes (38) are located in the second plate. A beam splitter (24) is located in front of the liquid crystal panel (26) for supplying polarized light to the first plate and for selectively transmitting polarized light emerging from the liquid crystal panel (24). The liquid crystal (34) comprises a nematic liquid crystal material having a positive birefringence and arranged in a homogeneous orientation with a constant director (n). This arrangement being such that incident polarized light is propagated in the liquid crystal in a double refraction mode with a first birefringence value and the emerging polarized light thereof is substantially transmitted by the second polarizer means (24) when a voltage is not applied to the liquid crystal; and incident polarized light is propagated in the liquid crystal in a double refraction mode with a second birefringence value smaller than the first birefringence value and the emerging polarized light thereof is not substantially transmitted by the second polarizer means (24) when a voltage is applied to the liquid crystal.

10 Claims, 10 Drawing Sheets

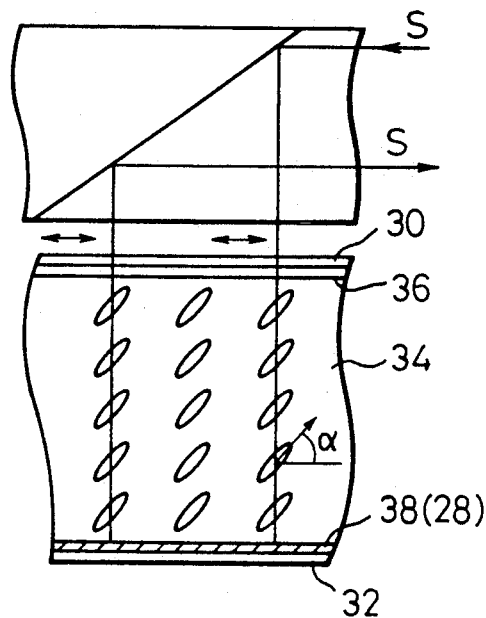
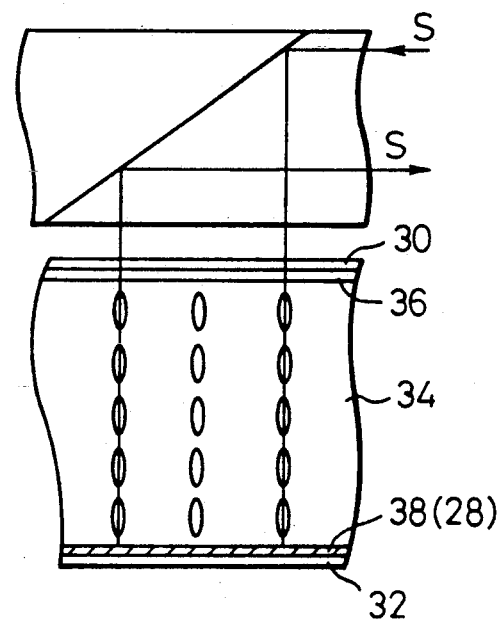
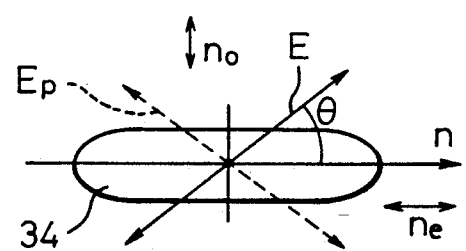

REFLECTION TYPE ACTIVE MATRIX LIQUID CRYSTAL APPARATUS

BACKGROUND OF THE INVENTION

1. Field of the Invention

The present invention relates to a reflection type liquid crystal apparatus using a twistless nematic liquid crystal.

2. Description of the Related Arts

Liquid crystal apparatuses are now used in a variety of displays, as liquid crystal displays can be made smaller in size and weight compared with CRT displays. Also, liquid crystal displays give a high degree of freedom of installation, and are easily adapted to a big screen system; in particular, a liquid crystal display is expected to be successful when applied to a high-definition television.

From the viewpoint of a propagation of light in the liquid crystal, two types of liquid crystal apparatuses are employed, i.e., a transmission type and a reflection type. In an application of the liquid crystal apparatus, for example, to a high-definition television, there is a need to increase the number of pictures (pixels), and thus an area of each of the pictures must become smaller due to the increase of the number of pictures. Also, when an active matrix driver including switching transistors is used for driving the liquid crystal, a ratio of an area of each switching transistor (for example, an FET) to an area of each picture becomes large (with the reduction of an area of each picture). Also, the characteristic property of FETs is changed if light is made incident thereon, and thus preferably the liquid crystal apparatus is arranged so that light is not incident on the FETs, i.e., it becomes necessary to block any incidence of light on the FETs, and accordingly, an aperture ratio of the transmission type liquid crystal apparatus must be reduced. In the case of the reflection type liquid crystal apparatus having a reflection layer, FETs can be arranged behind the reflection layers, and thus it is possible to provide a large aperture ratio. In this regard, it can be said that reflection type liquid crystal apparatus may be adapted to displays having a large size and a high resolution.

Conventionally, the reflection type liquid crystal apparatus used for displays employs a twisted nematic liquid crystal having a positive birefringence; such a conventional reflection type liquid crystal apparatus is shown in FIG. 18 of the attached drawings. As shown in FIG. 18, the reflection type liquid crystal apparatus comprises a beam splitter 1, a twisted nematic liquid crystal 2 accommodated between opposed plates 3a and 3b, a reflecting layer 3 provided on the rear plate 3b, and a projection lens 4 for projecting an image of light produced by this reflection type liquid crystal apparatus onto a screen (not shown) beyond the projection lens 4. The twisted nematic liquid crystal 2 consists of liquid crystal molecules having major axes extending in parallel to the plates 3a and 3b, and the axes are oriented rotatingly (twistingly) along the thickness of the liquid crystal from a position nearer to one of the plates 3a and 3b than to the other plates.

The beam splitter 1 splits light from a source (not shown) into a polarized light S and a polarized light P. Namely, the polarized light S having a plane of vibration in parallel to an incident plane to the beam splitter 1 is reflected by the beam splitter 1, and the polarized light P having a plane of vibration normal to the incident plane is transmitted by the beam splitter 1. Therefore, only the polarized light S is incident on the liquid crystal 2, reflected by the reflecting layer 3, and emitted from the liquid crystal 2. The plane of vibration of the polarized light rotates in accordance with one of several predetermined modes, while the polarized light propagates through the liquid crystal 2, so that in one circumstance, the emerging polarized light has the same plane of vibration as that of the incident polarized light S, and in another circumstance, the emerging polarized light has a different plane of vibration from that of the incident polarized light S. When the emerging polarized light has the same plane of vibration as that of the incident polarized light S, it is again reflected by the beam splitter 1 and does not reach the projection lens 4, and thus a black spot is produced on the screen located beyond the projection lens 4. When the emerging polarized light P has a different plane of vibration from that of the incident polarized light S it is transmitted by the beam splitter 1 and reaches the projection lens 4, and thus a white spot is produced on the screen.

In this conventional reflection type liquid crystal apparatus, the arrangement is such that, when a voltage is not applied to the liquid crystal 2, the emerging polarized light has the same plane of vibration as that of the incident polarized light S, and thus does not reach the projection lens 4 to thereby form a black spot on the screen. This is based on the fundamental nature of the twisted nematic liquid crystal, known as an optical activity. Namely, the polarized light S incident on the liquid crystal 2 is propagated in the latter with its plane of vibration rotated in conformity with the twist of the major axes of the molecules of the liquid crystal 2 (optical activity mode), is reflected by the reflecting layer 3, and is returned with its plane of vibration rotated in reverse, thereby to emerge from the liquid crystal 2. Accordingly, the emerging polarized light has the same plane of vibration as that of the incident polarized light S since the planes of vibration in the forward and return propagations are rotated by the same amount but in the opposite directions. Thus this emerging polarized light is reflected by the beam splitter 1 and is not transmitted to the projection lens 4, to thus cause a black spot on the screen. In this liquid crystal apparatus in which the propagation of the light is carried out in the optical activity mode, the arrangement is such that the plane of the vibration of the incident polarized light S coincides with the orientation of the axes (director) of the molecules of the liquid crystal 2 located near the front plate 3a, and accordingly, the incident polarized light S is not affected by a double refraction of the liquid crystal 2.

Then, when the voltage is applied to the liquid crystal 2, the molecules of the liquid crystal 2 tilt up relative to the plates 3a and 3b. If the molecules of the liquid crystal 2 are fully raised, however, the incident polarized light S is propagated along the major axes of the molecules of the liquid crystal 2 and either the optical activity or the double refraction does not occur, and thus the plane of vibration does not substantially vary, with the result that the emerging polarized light is the same as the incident polarized light S. This emerging polarized light S will be reflected by the beam splitter 1, the black spot maintained on the screen, and the light image not produced.

To produce the light image, the plane of vibration of the emerging polarized light must be changed from the plane of vibration of the incident polarized light S. To this end, it is necessary to regulate the applied voltage so that the molecules of the liquid crystal 2 are partially raised. In this state, a portion of the molecules of the liquid crystal 2 which are located near the plates 3a and 3b tends to maintain its original position extending in parallel to the plates 3a and 3b, and portions of the molecules of the liquid crystal 2 which are located inside of the plates 3a and 3b are gradually raised in accordance with their locations along the thickness of the liquid crystal 2. As a result, the propagation of the incident polarized light S in the liquid crystal 2 is not carried out in the optical activity mode but in the double refraction mode. In the double refraction mode, there is a difference in the velocity of ordinary light and that of extraordinary light, and the resultant polarized light rotates. As a result, the emerging polarized light has a different plane of vibration from that of the incident polarized light, and thus can be transmitted by the beam splitter 1 to thereby cause a white spot on the screen.

This conventional reflection type liquid crystal apparatus suffers from a problem in that the design of the liquid crystal panel is difficult because, in order to make a white (or a colored spot) spot on the screen, it is necessary to change the propagation of the liquid crystal 2 from the optical activity mode to the double refraction mode by applying a voltage to the liquid crystal 2, and in this double refraction mode, the polarized light must be propagated in the double refraction mode in the liquid crystal 2 which still maintains a twist structure. In addition, it is necessary but difficult to determine an optimum voltage to be applied to the liquid crystal 2 because, as described above, the double refraction does not occur if the molecules of the liquid crystal 2 are fully raised, and the voltage must be controlled so that the molecules of the liquid crystal 2 are partially raised so that the emerging polarized light has a particular plane of vibration different from that of the incident polarized light S. Also, even if an optimum voltage is determined, the state of the liquid crystal 2 itself is apt to fluctuate. Accordingly, a problem arises in that the contrast of the image is unstable. Also, it is necessary to consider an influence of the wavelength of the source of light. If the source has a wide band width wavelength, the plane of vibration of the obtainable polarized light varies in accordance with the wavelength of the source, leading to a variation of the brightness. Therefore, it is necessary to take measures in this regard, and when using the reflection type liquid crystal apparatus with the twist nematic liquid crystal, it may be necessary to adopt a complex arrangement, for example, by providing an additional compensating liquid crystal panel having an opposite twisting characteristic in addition to a main liquid crystal panel having a particular twisting characteristic.

SUMMARY OF THE INVENTION

The object of the present invention is to provide a reflection type liquid crystal apparatus which can provide an image with a clear contrast and has a relatively simple construction.

According to the present invention, there is provided a reflection type liquid crystal apparatus comprising a liquid crystal panel having a pair of first and second opposed plates for accommodating a liquid crystal therebetween and having outer and inner surfaces, respectively, electrode means arranged in each of the first and second opposed plates for applying a voltage to the liquid crystal, and a reflecting layer provided in the inner surface of the second plate, the first plate being transparent; a first polarizer means for supplying polarized light to the outer surface of the first plate; and a second polarizer means for selectively transmitting polarized light emerging from the liquid crystal panel, which is initially incident on the liquid crystal panel and reflected by the reflecting layer; characterized in that a liquid crystal in the liquid crystal panel is composed of a nematic liquid crystal material having a positive birefringence and arranged in a homogeneous orientation with a constant director; and the first polarizer means is arranged such that polarized light incident on the liquid crystal panel has a plane of vibration forming a predetermined angle relative to the director of the liquid crystal in the liquid crystal panel; wherein incident polarized light is propagated in the liquid crystal in a double refraction mode with a first birefringence value and the emerging polarized light substantially transmitted by the second polarizer means when a voltage is not applied to the liquid crystal; and incident polarized light propagated in the liquid crystal in a double refraction mode with a second birefringence value smaller than the first birefringence value and the emerging polarized light is not substantially transmitted by the second polarizer means when a voltage is applied to the liquid crystal.

With this arrangement, when a voltage is not applied to the liquid crystal, the incident polarized light is propagated in the liquid crystal in a double refraction mode with a first birefringence value and the emerging polarized light is substantially transmitted by the second polarizer means, to thereby make a white spot on a screen located beyond the second polarizer means. In this case, the irradiation of the light transmitted by the second polarizer means is greatest if the plane of vibration of the emerging polarized light is rotated by almost 90 degrees relative to the plane of vibration of the incident polarized light. Since a voltage is not applied to the liquid crystal, there is no fluctuation in the state of the liquid crystal and it is possible to establish a stable and bright display. Then, when a voltage is applied to the liquid crystal, the liquid crystal rises, and thus the birefringence becomes smaller. Accordingly, the incident polarized light is propagated in the liquid crystal in a double refraction mode with a second birefringence value smaller than the first birefringence value, and the emerging polarized light is not substantially transmitted by the second polarizer means, to thereby cause a black spot on the screen located beyond the second polarizer means. In this case, the voltage is applied such that the liquid crystal rises as much as possible, so that the plane of vibration of the emerging polarized light is not substantially rotated while the plane of vibration of the emerging polarized light is rotated by almost 90 degrees in the former circumstance, and an irradiation of the light transmitted by the second polarizer means becomes minimal. In this way, it is possible to provide an image with a clear contrast.

BRIEF DESCRIPTION OF THE DRAWINGS

The present invention will become more apparent from the following description of the preferred embodiments, with reference to the accompanying drawings, in which:

FIGS. 2A and 2B are views similar to FIG. 1, showing a state when a voltage is applied to the liquid crystal;

FIG. 3 is a view illustrating a molecule of the liquid crystal and a plane of vibration of the incident polarized light;

DESCRIPTION OF THE PREFERRED EMBODIMENT

Figure 5:
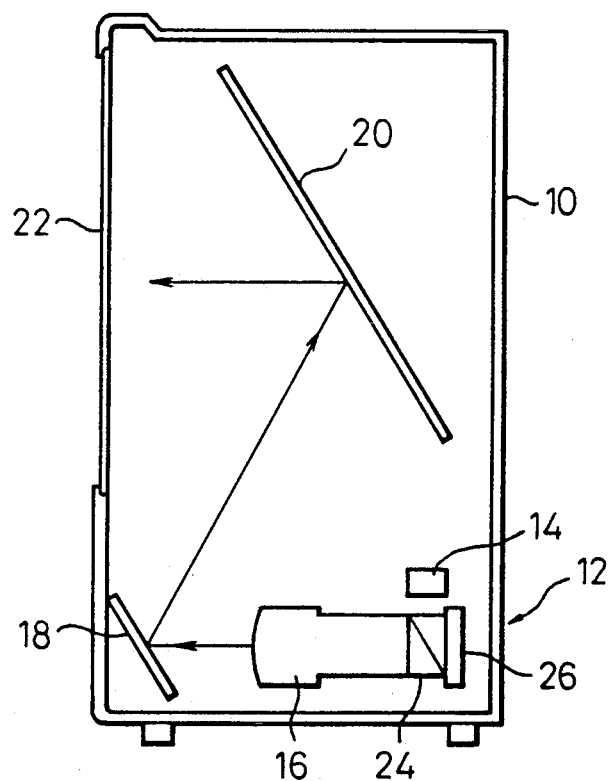
FIG. 5 is a view of the projection type television to which the present invention is applied.

FIG. 5 shows a projection type high-definition television, as an example of an application of the present invention, which has an outer casing 10. The outer casing 10 accommodates a reflection type liquid crystal apparatus 12, a source of light 14, a projection lens means 16, and reflection mirrors 18 and 20. Also, a screen 22 is mounted at the front of the television, and an image is formed thereon as spots of light by the reflection type liquid crystal apparatus 12, which is expanded by the projection lens means 16, and focused on the screen 22 via the reflection mirrors 18 and 20.

Figure 6:
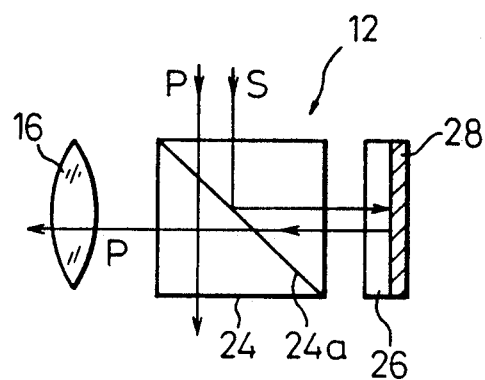
FIG. 6 is a view of the beam splitter and the liquid crystal panel of FIG. 5, showing the state when a voltage is not applied.
Figure 7:
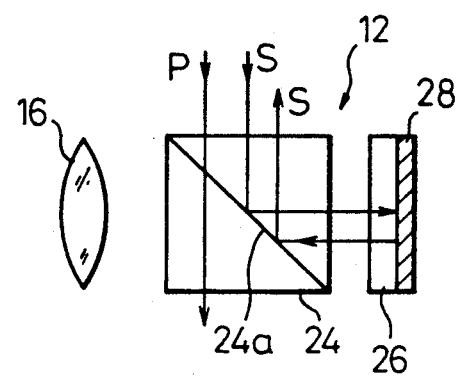
FIG. 7 is also a view of the beam splitter and the liquid crystal panel, showing the resulting state when a voltage is applied.

FIGS. 6 and 7 schematically show the reflection type liquid crystal apparatus 12 of FIG. 5. The projection lens means 16 is typically shown by the single convex lens but it will be apparent that the projection lens means 16 can comprise any combination of lenses. The reflection type liquid crystal apparatus 12 comprises a beam splitter 24 and a liquid crystal panel 26 having a reflecting layer 28.

In the embodiment, the beam splitter 24 serves commonly as a first polarizer which produces a polarized light from the light of the source 14, and supplies same to the liquid crystal panel 26, and as a second polarizer which selectively transmits the polarized light emerging from the liquid crystal panel 26 toward the projection lens 16. To this end, the beam splitter 24 has a semi-transmitting-reflecting membrane 24a located between the inclined surfaces of two prisms. The source of light beam supplies a light to the beam splitter 24 in a direction parallel to the outer surface of the liquid crystal panel 26, and thus a polarized light S of the light from the source 14 having a plane of vibration in parallel to the incident plane to the beam splitter 24 is reflected by the semi-transmitting-reflecting membrane 24a, and another polarized light P having a plane of vibration normal to the incident plane is transmitted through the semi-transmitting-reflecting membrane 24a. In this way, the beam splitter 24 serves as a first polarizer.

The polarized light S incident on the liquid crystal panel 26 is reflected by the reflecting layer 28 and emerges again from the liquid crystal panel 26. The plane of vibration of the initially incident polarized light S is controlled by the double refraction action while it is propagated in the liquid crystal layer of the liquid crystal panel 26, and depending on the control modes, either the polarized light S having the same plane of vibration as that of the incident polarized light S, or the polarized light P having a different plane of vibration from that of the incident polarized light S, emerges from the liquid crystal panel 26. The emerging polarized light S having the same plane of vibration as that of the incident polarized light S is reflected by the semi-transmitting-reflecting membrane 24a of the beam splitter 24 and does not reach the projection lens means 16 (FIG. 7), and the emerging polarized light P having a different plane of vibration from that of the incident polarized light S is transmitted by the semi-transmitting-reflecting membrane 24a of the beam splitter 24 and reaches the projection lens means 16 (FIG. 6). In this way, the beam splitter 24 serves as a second polarizer.

Figure 8:
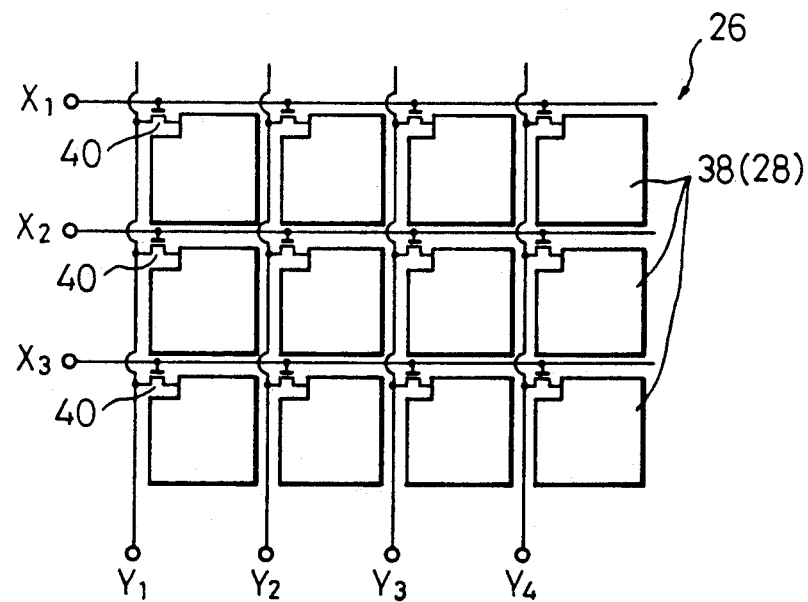
FIG. 8 is a view of picture electrodes of FIG. 9.
Figure 9:
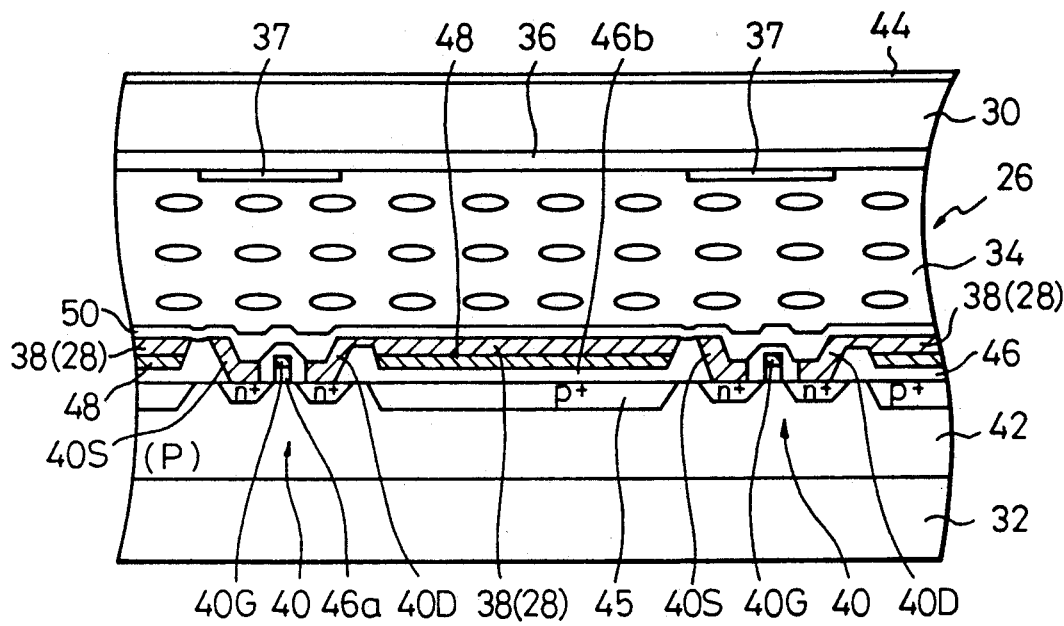
FIG. 9 is a cross-sectional view of the liquid crystal panel of the present invention.

Referring to FIGS. 8 and 9, the liquid crystal panel 26 comprises an incident-side glass plate 30, a reflection-side glass plate 32, a liquid crystal 34 accommodated therebetween, and a group of electrodes for applying a voltage to the liquid crystal 34. The electrodes comprise a common transparent electrode 36 formed continuously over the inner surface of the incident-side glass plate 30, and a plurality of minute picture electrodes 38 formed in the inner surface of the reflection side glass plate 32, in a predetermined pattern and shape. The picture electrodes 38 are made from aluminum or gold and also serve as the reflecting layer 28. The picture electrodes 38 are connected to an active matrix driver comprising scanning lines $X_1$, $X_2$, $X_3$, signal lines $Y_1$, $Y_2$, $Y_3$, and field effect transistors 40 working as switching transistors. In FIG. 9, a P-type silicon substrate 42 is attached to the reflection-side glass plate 32, and MOSFETs 40 and other electrodes are formed on this substrate 42 while covered with appropriate insulating layers. Also, a reflection preventing layer 44 is provided on the outer surface of the incident-side glass plate 30, to prevent a reflection loss of the incident and emerging polarized light from the incident-side glass plate 30.

Each FET 40 comprises a gate provided on the silicon substrate 42 via an insulating layer 46a, and a source and a drain provided as (n+) layers on either side of the gate, with a gate electrode 40G, a source electrode 40S, and a drain electrode 40D attached to these elements. The gate electrodes 40G are connected to the scanning lines $X_1$, $X_2$, $X_3$ of the active matrix driver, the source electrode 40S is connected to the signal lines $Y_1$, $Y_2$, $Y_3$, and the drain electrode 40D is connected to the picture electrodes 38. An insulating layer 46 is provided between the silicon substrate 42 and the electrodes. Further, an insulating layer 50 may be provided over the electrodes.

Furthermore, storage capacitance electrodes 45 are provided as (p+) layers in the silicon substrate 42, and cooperating storage capacitance electrodes 48 are provided as polysilicon layers under the picture electrodes 38, with resistance layers 46b therebetween to thereby form storage capacitances in parallel to the liquid crystal 34. These electrodes 45 and 48 are provided in register with the picture electrodes 38, and separated from the transistors 40. That is, the picture electrodes 38 do not substantially extend beyond the margins of the respective electrodes 48 into the regions of the transistors 40. This design allows the picture electrodes 38 to be easily formed with a flat surface, to be thus adapted as the reflections layers 28, since the picture electrodes 38 can be located only on the flat electrodes 48. Further, light blocking layers 37 are provided in the inner surface of the incident-side glass plate 30, and cover the transistors 40.

Figure 1:
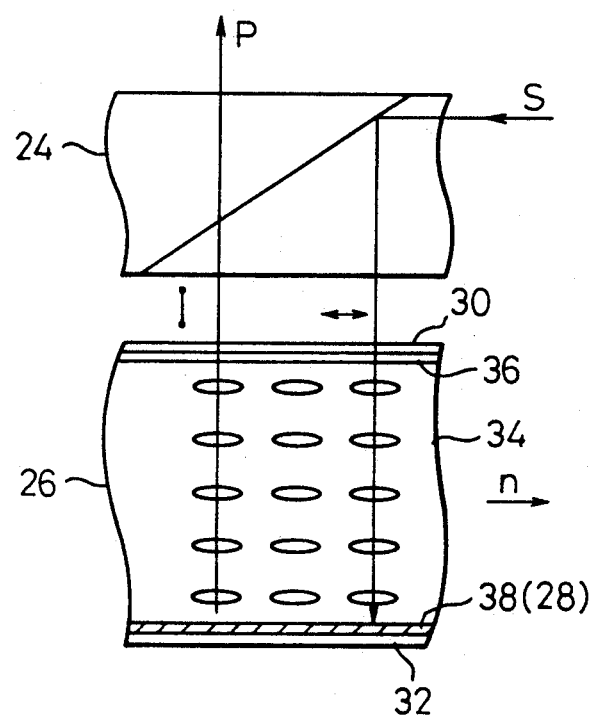
FIG. 1 is a schematic view of a preferred embodiment of the present invention, showing a state when a voltage is not applied to the liquid crystal.

As shown in FIGS. 1 and 9, the liquid crystal 34 accommodated between the incident-side glass plate 30 and the reflection-side glass plate 32 comprises a nematic liquid crystal material having a positive birefringence and arranged in a homogeneous orientation. That is, the birefringence value of the liquid crystal based on the anisotropy of the material, $\Delta n$ ($\Delta n = n_e - n_o$) is positive, and the major axes of molecules of the liquid crystal 34 are arranged in parallel to the incident and reflection side glass plates 30 and 32, with a constant director n. The director n is used to define the direction of the major axes of molecules of the liquid crystal. There are many known nematic liquid crystal materials which can be used in the present invention, and the following materials are listed only as examples; p-alkyl-p'-alkoxyazoxybenzene, p-alkylbenzylidene-p'-cyanoaniline, phenylbenzoate, and p-alkyl-p'-cyanobiphenyl.

One way of controlling the orientation of the liquid crystal is to provide orientation layers in the inner surface of the incident and reflection side glass plates 30 and 32, respectively, and to rub the surfaces of the orientation layers with an appropriate fabric material, in the desired directions. It is known that molecules of the liquid crystal will extend or orient in accordance with the rubbing direction. The twisted nematic liquid crystal is obtained by rubbing the orientation layer in the incident-side glass plate 30 in one direction, and the orientation layer in the reflection-side glass plate 32 in a direction at an angle, for example, 45 degrees, relative to the former direction. In contrast, the homogeneous oriented liquid crystal is obtained by rubbing the orientation layers in the incident and reflection side glass plates 30 and 32 in parallel to each other.

As shown in FIG. 3, the beam splitter 24 and the liquid crystal panel 26 are arranged such that the polarized light S initially incident from the beam splitter 24 on the liquid crystal panel 26 has a plane of vibration E forming a predetermined angle $\theta$ relative to the director n of the liquid crystal 34. This angle $\theta$ causes the polarized light S to be propagated in the liquid crystal 34 in a double refraction mode in the shape of separated ordinary light $n_o$ and extraordinary light $n_e$. Preferably, the angle $\theta$ is 45 degrees.

With this arrangement, when a voltage is not applied to the liquid crystal between the transparent electrode 36 and a selected one of the picture electrodes 38, the molecules of the liquid crystal 34 are oriented in parallel to the incident and reflection side glass plates 30 and 32, as shown in FIG. 1. Accordingly, the incident polarized light S is propagated in the liquid crystal 34 in a double refraction mode with a first birefringence value, and the plane of vibration E of the propagating polarized light rotated in accordance with the difference of the velocity between the ordinary light $n_o$ and extraordinary light $n_e$. Accordingly, the plane of vibration E of the polarized light reflected by the reflecting layer 28 and emerging from the liquid crystal panel 26 is rotated far from the plane of vibration E of the initially incident polarized light S, to the plane of vibration $E_p$, as shown in FIG. 3, which may be equivalent to the plane of vibration of the polarized light P. Thus the emerging polarized light P is substantially transmitted by the semi-transmitting-reflecting membrane 24a of the beam splitter 24 to the projection lens 16, to thereby form a bright spot on the screen 22.

Then, when a voltage is applied to the liquid crystal 34, the liquid crystal 34 rises and the major axes of the molecules of the liquid crystal 34 form a tilt angle $\alpha$ with the plane of the incident and reflection side glass plates 30 and 32, as shown in FIG. 2A. Usually, the tilt angle $\alpha$ has a tendency to have a smaller value at a position near the plates 30 and 32 and a larger value at a position between the plates 30 and 32. It is possible to analyze the behavior of the liquid crystal 34 as a whole by using the average value of the tilt angle $\alpha$ between the plates 30 and 32, as such an average value corresponds to the applied voltage. The tilt angle $\alpha$ (and the average value) of the liquid crystal 34 becomes larger with an increase of the applied voltage, with the result that the birefringence of the liquid crystal 34 becomes smaller. Accordingly, the amount of the rotation of the incident polarized light S in the liquid crystal 34 becomes smaller and the emerging polarized light is close to the incident polarized light S. Therefore, the emerging polarized light emerging from the liquid crystal 34 is gradually less transmitted by the semi-transmitting-reflecting-membrane 24a of the beam splitter 24, and the amount of light passing to the projection lens means 16 is reduced to cause a darkening of the image of the picture. When the molecules of the liquid crystal 34 are fully raised, as shown in FIG. 2B, the spot on the screen is black. In this black state, the birefringence of the liquid crystal 34 is considered to be substantially zero, and there is no dependency on the wavelength of the light of the source 14, and therefore, it is possible to obtain a clear contrast between the bright state and the black state.

In addition, the molecules of the liquid crystal 34 generally maintain the state of FIG. 1 when the applied voltage is lower than a threshold voltage and the molecules of the liquid crystal 34 begin to rise when the applied voltage exceeds the threshold voltage and then the tilt angle $\alpha$ becomes larger due to the increase of the applied voltage. Therefore, it will be appreciated that, in this description and in the appended claims, the expressions "when the voltage is not applied" and "when the voltage is applied" will be understood to be mean that the applied voltage is lower or higher than the threshold voltage, respectively.

Figure 16:
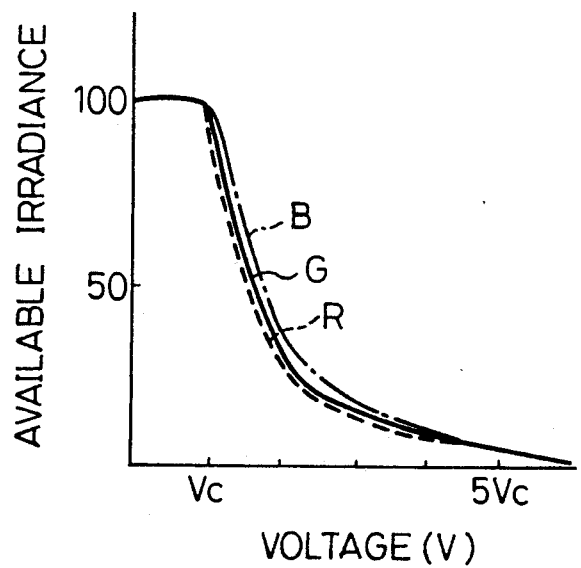
FIG. 16 is a view of the available irradiation according to the arrangement of FIG. 18.

FIG. 16 shows the available irradiation of light emerging from the beam splitter 24, i.e., the amount of light transmitted by the beam splitter 24 to the projection lens 16, according to the present invention. When the voltage is not applied, i.e., the voltage is lower than the threshold voltage $V_c$, the polarized light S is propagated in the liquid crystal 34 in a double refraction mode with a first birefringence value, causing the plane of vibration E to be rotated by a greater extent, and the polarized light emerging from the liquid crystal panel 26 is substantially transmitted by the semi-transmitting-reflecting membrane 24a of the beam splitter 24. Therefore, a considerable amount of light (100 percent) reaches the screen 22 via the projection lens means 16. When the voltage is applied, i.e., the voltage is higher than the threshold voltage $V_c$, the polarized light S is propagated in the liquid crystal 34 in a double refraction mode with a second birefringence value smaller than the first birefringence value. In this case, the plane of vibration E is also rotated but the amount of the rotation becomes smaller with an increase of the applied voltage.

According to the present invention, a higher voltage can be selected (for example, $5V_c$), so that the molecules of the liquid crystal 34 are fully raised, as shown in FIG. 2B. In this case, the emerging polarized light P is close to the incident polarized light S, in view of the plane of vibration E during the propagation in the liquid crystal 34, and thus less of the emerging polarized light P as transmitted by the semi-transmitting-reflecting-membrane 24a of the beam splitter 24, to almost completely shut off the light to the screen 22, and therefore, a clear contrast is obtained.

Figure 17:
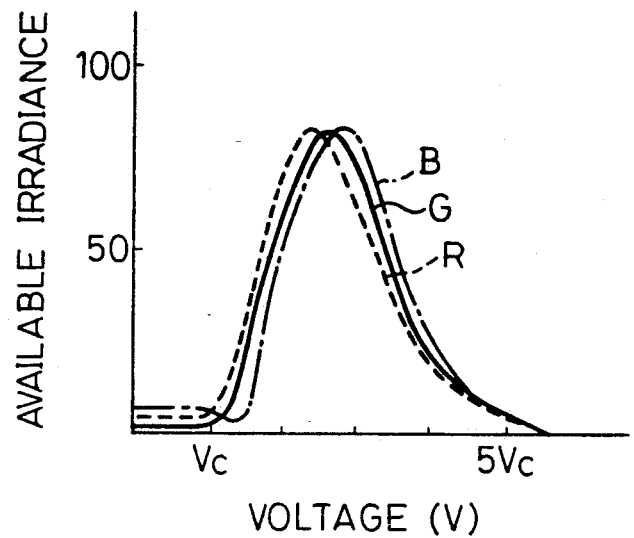
FIG. 17 is a view of the available irradiation according to the present invention.
Figure 18:
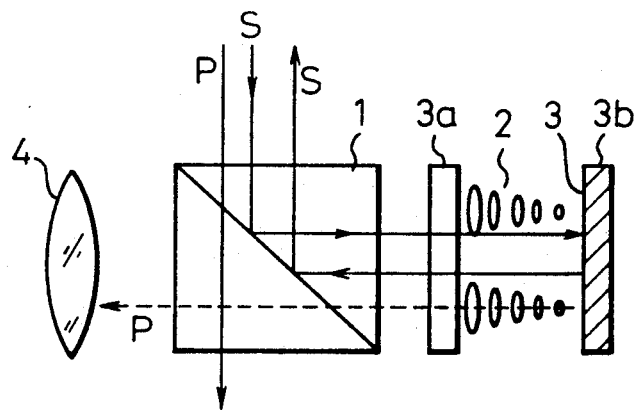
FIG. 18 is a view illustrating the prior art.

FIG. 17 shows the available irradiation of light according to the arrangement of the prior art of FIG. 18. When the voltage is not applied, the polarized light S is propagated in the liquid crystal 2 in the optical activity mode to shut off the light to the screen. In this case, however, there may be a small tilt of a portion of the molecules of the liquid crystal 2 located near the plates 3a and 3b, so that a complete optical activity cannot be obtained and the polarized light may be slightly transmitted by the beam splitter 4, causing a slight light leakage onto the screen that must be maintained black, and this may reduce the contrast. When the voltage is applied, the polarized light S is propagated in the twisted liquid crystal 34 in a double refraction mode, and in this case, the available light follows a characteristic curve which has a peak at a particular voltage. Therefore, it is necessary to select a particular voltage to obtain a maximum contrast between the bright and the black, as previously described. Also, other problems exist in the prior art.

Figure 12:
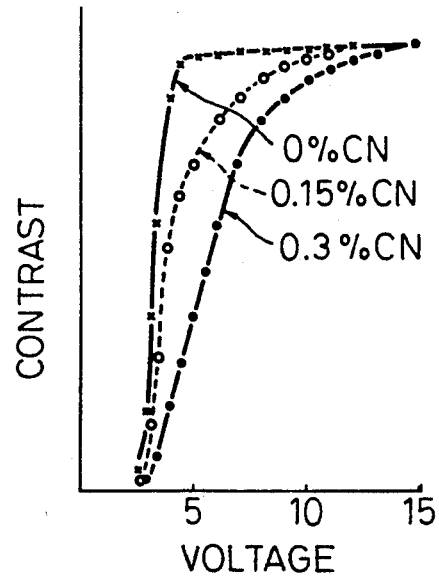
FIG. 12 is a view of the contrast when a cholesteric material is added to the nematic material.

Further, the threshold voltage of the nematic liquid crystal material in a homogeneous orientation is based on only a modulus of a spray elasticity $K_{11}$, so that the characteristic of the transmission versus the voltage of the liquid crystal is sharply changed. In the liquid crystal panel 26 driven by the active matrix, there may be a preferable case in which the characteristic of the transmission versus the voltage of the liquid crystal changes more smoothly, to improve the color reproduction. In such a case, it is preferable that a small amount of a cholesteric liquid crystal material (CN) is added to the positive nematic liquid crystal material, as shown in FIG. 12, to obtain a smooth characteristic of the transmission versus the voltage of the liquid crystal.

Figure 4:
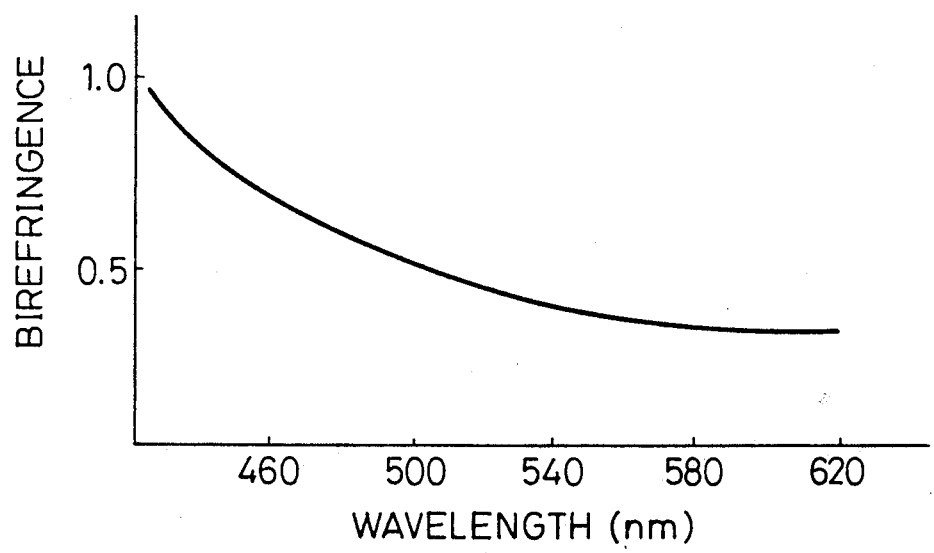
FIG. 4 is a view showing a relationship between the wavelength and the birefringence.

Further, the above description includes only the emerging polarized light P or the emerging polarized light S, but the actual emerging polarized light includes a mixture of the component of the polarized light P and the component of the polarized light S; the greater the component of the polarized light P, the greater amount the light transmitted by the beam splitter 24 and the brighter the image obtained. In order to obtain the brightest image on the screen when a voltage is not applied, it is to preferable to satisfy the relationship explained below; wherein d is a thickness of the liquid crystal, $\lambda_c$ is a wavelength of the source of light to be used. $n_{ec}$ and $n_{oc}$ are refractive indices of extraordinary light and ordinary light at that wavelength, and $\Delta n_c$ ($\Delta n_c = n_{ec} - n_{oc}$) is a birefringence value at that wavelength. Also, the birefringence has a dependency on the wavelength, as shown in FIG. 4, and thus it is necessary to consider the wavelength of the light of the source.

This is determined by the amount of rotation of the plane of vibration E of the polarized light S, assuming that the polarized light S having the plane of vibration E is incident on the liquid crystal 34 with the plane of vibration E forming an angle $\theta$ with the director n of the liquid crystal 34, and is propagated in the liquid crystal 34 having a thickness of 2d (forward and return). Generally, when the polarized light is propagated in a double refractory material having a thickness of 2d, the phase angle $\Delta$ is:

$$\Delta \phi = \frac{4\pi d \Delta n_c}{\lambda_c}$$

The above relationship when the phase angle $\Delta \phi$ is $\pi$ is:

$$\frac{d \Delta n_c}{\lambda_c} = \frac{1}{4}$$

It is known that the amount of the rotation of the plane of vibration E of the polarized light S is $2\theta$ when the phase angle $\Delta \phi$. If $\theta$ is 45 degrees, $2\theta$ is 90 degrees. Therefore, the plane of vibration E of the incident polarized light S is rotated by 90 degrees and becomes an equivalent of the polarized light P of the light source.

Therefore, if the above relationship is satisfied, the component of the polarized light P comprise the most part of the emerging light, which will create the brightest image and a good contrast relative to the dark spot when the voltage is applied if the brightness of the source is constant. The same result will be obtained when $2\theta$ is 270 degrees. In this case, the relationship is $$\frac{d \Delta n_c}{\lambda_c} = \frac{3}{4}$$

When m is zero or natural, the following general relationship is obtained.

$$\frac{d \Delta n_c}{\lambda_c} = \frac{(2m + 1)}{4}$$

Figure 10:
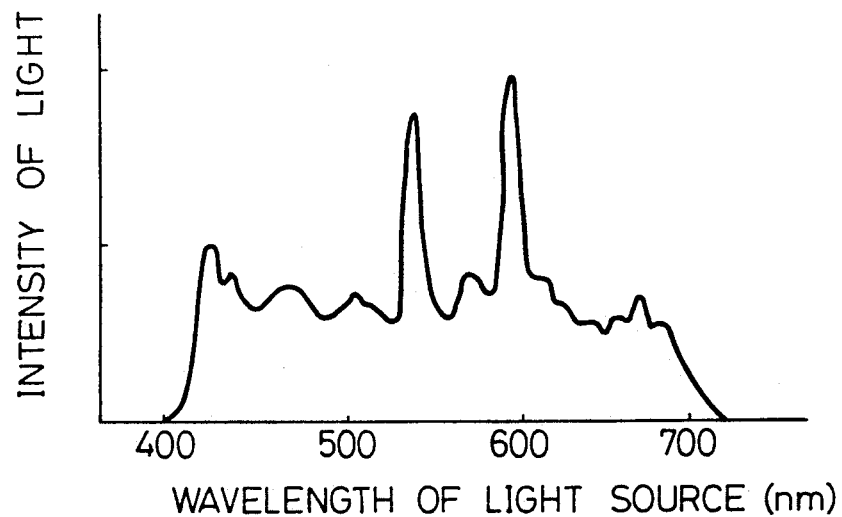
FIG. 10 is a view of a spectrum of the source of light.
Figure 11:
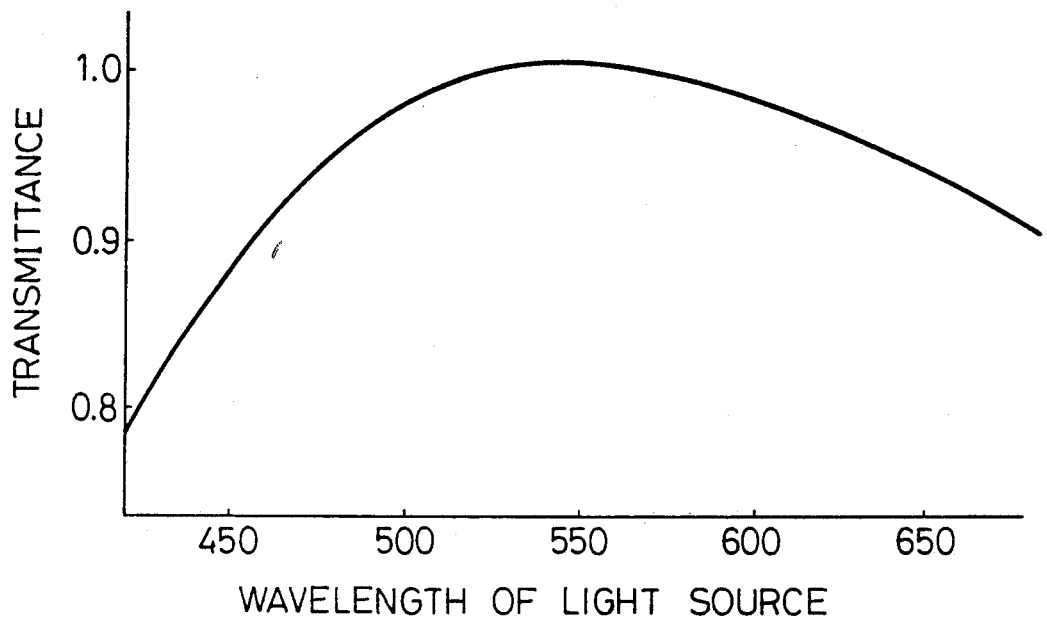
FIG. 11 is a view illustrating a transmittance of light having a central wavelength of 550 nm.

It is preferable to select a central wavelength $\lambda_c$ of the spectrum when the source 14 includes a wavelength band comprising a variety of wavelengths. For example, FIG. 10 shows a spectrum of a metal halide lamp adapted for use as the source 14 of the present invention, and having a central wavelength of 550 nm. FIG. 11 shows a transmittance of the beam splitter 24 when the thickness d of the liquid crystal 34 is chosen in accordance with the following relationship, so that the plane of the vibration of the incident polarized light S is rotated by 90 degrees. The transmittance has a peak at the central wavelength and decreases gradually on either side of the peak, and the rate of the reduction of the transmittance is relatively small over a wide region of the wavelength. Therefore, if the entire transmittance is obtained by integrating the curve of FIG. 11, a fluctuation of the entire transmittance will be relatively small.

Figure 13:
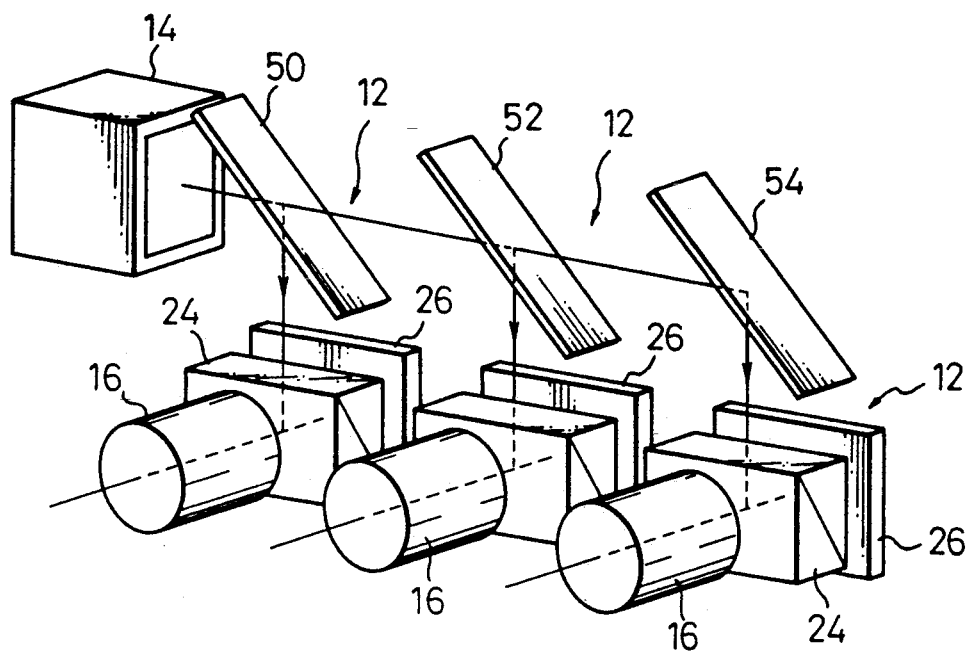
FIG. 13 is a view of a set of three liquid crystal apparatuses used in a colored display.
Figure 14:
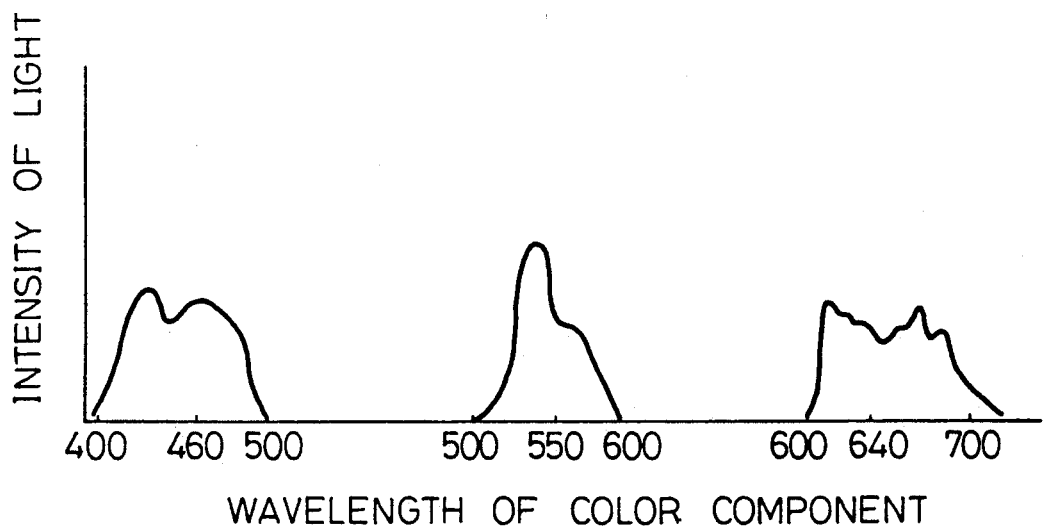
FIG. 14 is a view of a spectrum of light separated into colored regions.

FIG. 13 shows a liquid crystal apparatus used in a color display and comprising a set of three such liquid crystal apparatuses 12. Each apparatus 12 comprises a beam splitter 24, a liquid crystal panel 26 and a projection lens 16, similar to the apparatus 12 of the previous embodiment. Dyechroic mirrors 50, 52 and 54 are arranged in the optical path from the source 14 to the respective beam splitters 24, and these dyechroic mirrors 50, 52 and 54 act to separate the light of the source 14 into red, green, and blue components, as shown in FIG. 14. For example, as shown in FIG. 14, the dyechroic mirror 50 reflects the red wavelength component within the region of from 600 to 750 nm (central wavelength 640 nm) to the related beam splitter 24, and transmits the remaining wavelength component; the next dyechroic mirror 52 reflects the green wavelength component within the region of from 500 to 600 nm (central wavelength 550 nm) to the related beam splitter 24, and transmits the remaining wavelength component; and the last dyechroic mirror 54 reflects the blue wavelength component within the region of from 400 to 500 nm (central wavelength 460 nm) to the related beam splitter 24.

The separated color wavelength component is selectively transmitted by the respective beam splitter 24 and liquid crystal panel 26, and focused at the screen via the projection lens. Alternatively, the respective color wavelength components transmitted by the beam splitters 24 are collected at a dyechroic prism (not shown) and then projected by the projection lens.

In this arrangement, the thickness of the liquid crystal 34 of each of the liquid crystal panels 26 is determined on the basis of the central wavelength of the respective color wavelength components, as follows.

$$\frac{d_r \Delta n_{rc}}{\lambda_{rc}} = \frac{d_g \Delta n_{gc}}{\lambda_{gc}} = \frac{d_b \Delta n_{bc}}{\lambda_{bc}} = \frac{(2m + 1)}{4}$$

where $\lambda_{rc}$, $\lambda_{gc}$ and $\lambda_{bc}$ are central wavelengths of the respective color regions, $\Delta n_{rc}$ ($\Delta n_{rc} = n_{rec} - n_{roc}$), $\Delta n_{gc}$ ($\Delta n_{gc} = n_{gec} - n_{goc}$) and $\Delta n_{bc}$ ($\Delta n_{bc} = n_{bec} - n_{boc}$) are birefringence values of the liquid crystal at the respective central wavelength $\lambda_{rc}$, $\lambda_{gc}$ and $\lambda_{bc}$, $d_r$, $d_g$ and $d_b$ are thicknesses of the liquid crystal 34 of the respective liquid crystal panel 26, and m is zero and natural number. If this relationship is satisfied, the clearest contrast for each color can be obtained.

Figure 15:
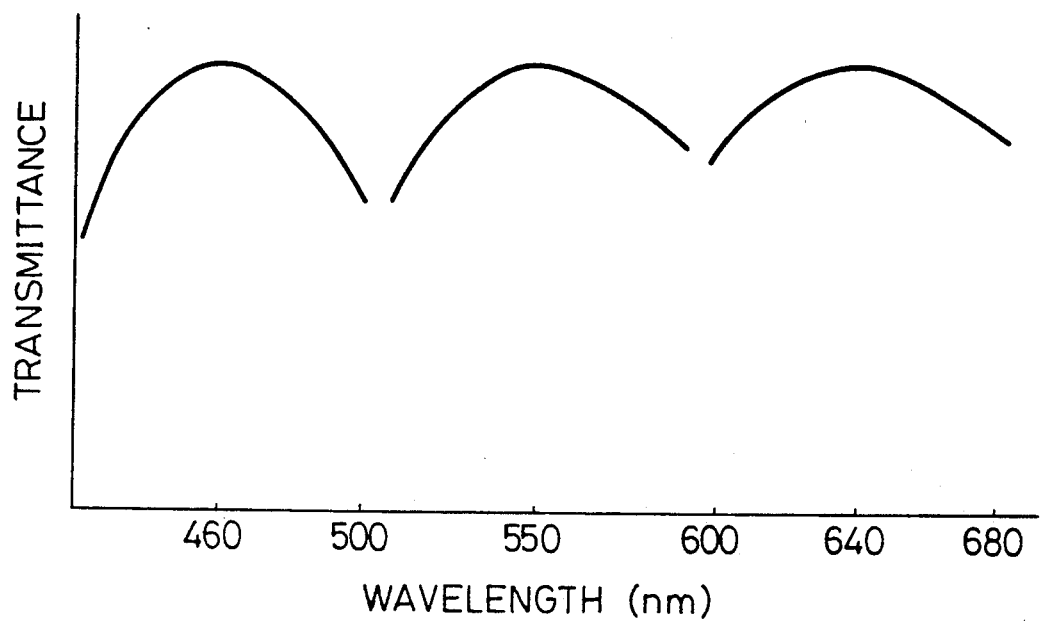
FIG. 15 is a view of a transmittance of the light having the respective central wavelength.

FIG. 15 shows the transmittance of each of the beam splitters 24 when the thickness d of the liquid crystal 34 is chosen in accordance with the above. The transmittance has a peak at the central wavelength of the respective color wavelength regions and decreases gradually on either side of the peak, and the peak values are generally the same. Therefore, it is possible to clearly reproduce the original color by composing the transmitted color wavelength regions. The reduction of the transmittance is within 3 percent if the wavelength is offset from the predetermined central wavelength of the respective color wavelength regions, and fluctuations occurring in a bright condition when the voltage is not applied are usually small enough to be ignored.

As will be apparent from the above, a reflection type liquid crystal apparatus according to the present invention, which can provide an image with a clear contrast, has a relatively simple construction.

We claim:

1. A reflection type liquid crystal apparatus comprising:
    a liquid crystal panel comprising:
        a pair of first and second, substantially parallel plates arranged in opposed relationship and having respective inner and outer surfaces, the first plate being transparent,
        a first, common electrode formed as a continuous layer on the inner surface of the first plate,
        a matrix of a plurality of picture elements and an associated active matrix driver formed on the inner surface of the second plate, the picture elements being positioned in alignment in first and second directions and spaced by intervening spaces between the respective peripheries of the adjacent picture elements in each of the first and second directions, and the active matrix driver comprising a plurality of switching elements respectively associated with the plurality of picture elements and formed in the respective intervening spaces and first and second pluralities of electrical conductors extending respectively in the first and second directions and formed in the corresponding intervening spaces, each switching element interconnecting the respectively associated picture element with respectively corresponding ones of the first and the second pluralities of conductors and being selectively operable for applying a voltage, supplied to the corresponding conductors, to the respectively associated picture element, each picture element furthermore comprising a storage capacitor of uniform thickness formed on the inner surface of the second plate and having an outer perimeter spaced from the switching elements of the active matrix driver formed within the respectively associated intervening spaces and a picture element electrode formed in registry with and on a capacitance electrode of the respectively associated storage capacitor and having an outer perimeter disposed inwardly of the outer perimeter of the respectively associated storage capacitor and having an outer perimeter disposed inwardly of the outer perimeter of the respectively associated storage capacitor, the picture element electrodes defining a reflecting layer of the liquid crystal panel, and
        a nematic liquid crystal material received within and filling the space between the first and second opposed plates of the liquid crystal panel and having a positive birefringence and arranged in a homogeneous orientation with a constant director;
    a light beam source;
    means for selectively controlling each of the switching elements for selectively applying the voltage, supplied to the corresponding conductors, to the respectively associated picture element of the liquid crystal panel; and
    polarizer means selectively operable for receiving the light beam from the light beam source and supplying a polarized light beam to, and so as to be incident on, the outer surface of the first plate, the incident polarized light beam having a plane of vibration which forms a selected angle relative to the director of the liquid crystal material in the liquid crystal panel and propagating through the liquid crystal panel and being reflected internally therein by the reflecting layer, and the polarizer means further being selectively operable for receiving a reflected light beam emerging from the liquid crystal panel and selectively transmitting therethrough the received, emerging light beam and, for each picture element and in the absence of a voltage being applied thereto, the incident polarized light beam propagating therethrough in a double refraction mode with a first birefringence value and after being internally reflected therein by the reflecting layer propagating therethrough and emerging from the first plate of the liquid crystal panel as an emerging polarized light beam which is substantially transmitted by the polarizer means, and when a voltage is selectively applied to the picture element, the incident polarized light beam propagating through the liquid crystal panel in a double refraction mode with a single birefringence value, smaller than the first birefringence value, and after being internally reflected therein by the reflecting layer emerging as an emerging polarized light beam which is not substantially transmitted by the polarizer means.

2. A reflection type crystal apparatus as recited in claim 1, wherein the matrix of picture elements further comprises:

a uniform thickness layer of a semiconductor substrate formed on the inner surface of the second plate and having a plurality of doped regions formed therein spaced by the intervening spaces and respectively defining the plurality of picture elements, each doped region comprising a first capacitance electrode and having a periphery defined by first and second transverse dimensions in the first and second directions;

an insulating layer formed on the substrate and including a plurality of portions of uniform thickness over the respective plurality of doped regions ad a relatively thicker boarder portion formed over the periphery of each doped region and bordering the corresponding, intervening space;

a plurality of second capacitance electrodes formed on respective uniform thickness portions of the insulating layer and having fifth and sixth dimensions respectively in the first and second directions which are substantially the same as the third and fourth dimensions, respectively; and a plurality of picture electrodes formed respectively on the plurality of second capacitance electrodes, each having seventh and eighth dimensions in the first and second directions, respectively, which are substantially the same as the fifth and sixth dimensions, respectively, and less than the first and second dimensions, respectively.

3. A reflection type liquid crystal apparatus according to claim 1, wherein light blocking layers are provided over the switching elements, respectively, for blocking light incident on the switching elements.

4. A reflection type liquid crystal apparatus according to claim 1, wherein a reflection preventing layer is provided on the outer surface of the first plate.

5. A reflection type liquid crystal apparatus according to claim 1, wherein the polarizer means comprise a beam splitter having a semi-transmitting-reflecting membrane.

6. A reflection type liquid crystal apparatus according to claim 5, wherein the beam splitter is arranged such that the beam splitter receives light from the source in a direction in parallel to the outer surface of the first plate and splits the light into a polarized light which is reflected by the semi-transmitting-reflecting membrane means to be directed to the liquid crystal panel and another polarized light which is transmitted through the semi-transmitting-reflecting membrane means, and further, receives polarized light emerging from the liquid crystal panel which is initially incident on the liquid crystal panel and is reflected by the reflecting layer, and reflects the polarized light at the semi-transmitting-reflecting membrane means if the polarized light has the same plane of vibration as that of the initially incident light, and transmit said light through the semi-transmitting-reflecting membrane means if the polarized light has a different plane of vibration from that of the initially incident light.

7. A reflection type liquid crystal apparatus according to claim 1, as used in a monochromatic display, and wherein the following relationship is satisfied $$\frac{d\Delta n_c}{\lambda_c} = \frac{(2m+1)}{4}$$

where $\lambda_c$ is a central wavelength of the source of light to be used, $\Delta n_c$ ($\Delta n_c = n_{ec} - n_{oc}$) is a birefringence value of the liquid crystal at the central wavelength $\lambda_c$, d is a thickness of the liquid crystal, and m is zero or natural number.

8. A reflection type liquid crystal apparatus according to claim 1, as used in a color display as a set of three such liquid crystal panels each according to claim 1, wherein the following relationship is satisfied $$\frac{d_r \Delta n_{rc}}{\lambda_{rc}} = \frac{d_g \Delta n_{gc}}{\lambda_{gc}} = \frac{d_b \Delta n_{bc}}{\lambda_{bc}} = \frac{(2m+1)}{4}$$

where the set of three such liquid crystal panels receive separated regions of red, green, and blue wavelengths of the light source respectively, $\lambda_{rc}$, $\lambda_{gc}$ and $\lambda_{bc}$ are central wavelengths of the respective color regions, $\Delta n_{rc}$ ($\Delta n_{rc} = n_{rec} - n_{roc}$), $\Delta n_{gc}$ ($\Delta n_{gc} = n_{gec} - n_{goc}$) and $\Delta n_{bc}$ ($\Delta n_{bc} = n_{bec} - n_{box}$) are birefringence values of the liquid crystal at the respective central wavelength $\lambda_{rc}$, $\lambda_{gc}$ and $\lambda_{bc}$, $d_r$, $d_g$, and $d_b$ are thicknesses of the liquid crystal of the respective liquid crystal panel, and m is zero or natural number.

9. A reflection type liquid crystal apparatus according to claim 1, wherein the liquid crystal material further comprises a cholesteric material.

10. A reflection type liquid crystal apparatus according to claim 1, further comprising a projection lens positioned to receive the light emerging from the polarizer means, mirrors, and a screen.

* * * * *

UNITED STATES PATENT AND TRADEMARK OFFICE
CERTIFICATE OF CORRECTION

PATENT NO. : 5,251,049
DATED : October 5, 1993
INVENTOR(S) : Masuji SATO et al.

It is certified that error appears in the above-indentified patent and that said Letters Patent is hereby corrected as shown below:

Col. 13, line 43, change "ad" to --and--.

Col. 14, line 53, change "$n_{box}$" to --$n_{boc}$--.

Signed and Sealed this

Eleventh Day of October, 1994

Attest:

Attesting Officer

BRUCE LEHMAN

Commissioner of Patents and Trademarks